US00RE38676E

(19) United States
(12) Reissued Patent
Grubbs et al.

(10) Patent Number: US RE38,676 E
(45) Date of Reissued Patent: Dec. 21, 2004

(54) THERMALLY INITIATED POLYMERIZATION OF OLEFINS USING RUTHENIUM OR OSMIUM VINYLIDENE COMPLEXES

(75) Inventors: Robert H. Grubbs, South Pasadena, CA (US); Thomas E. Wilhelm, Plainfield, NJ (US)

(73) Assignee: California Institute of Technology, Pasadena, CA (US)

(21) Appl. No.: 10/224,679

(22) Filed: Aug. 21, 2002

Related U.S. Patent Documents

Reissue of:
(64) Patent No.: 6,107,420
Issued: Aug. 22, 2000
Appl. No.: 09/358,654
Filed: Jul. 26, 1999

U.S. Applications:
(60) Provisional application No. 60/094,902, filed on Jul. 31, 1998.

(51) Int. Cl.[7] ..... C08F 2/00; C08F 4/80
(52) U.S. Cl. ..... 526/73; 526/171; 526/172; 526/281; 526/283; 526/922; 556/21; 556/22; 556/136; 502/152; 502/162; 264/5; 524/81
(58) Field of Search ..... 556/22, 136, 21; 526/171, 172, 73, 281, 283, 922; 524/81; 502/152, 162; 264/5

(56) References Cited

U.S. PATENT DOCUMENTS 5,342,909 A * 8/1994 Grubbs et al. ..... 526/171
5,710,298 A * 1/1998 Grubbs et al. ..... 556/22
5,728,917 A * 3/1998 Grubbs et al. ..... 585/653
5,831,108 A * 11/1998 Grubbs et al. ..... 556/21

FOREIGN PATENT DOCUMENTS

WO 97/06185 * 2/1997

OTHER PUBLICATIONS

Katayama, H., et al., "Convenient Routes to Vinylideneruthenium Dichlorides with Basic and Bulky Tertiary Phosphine Ligands ($PPr^{i3}$ and $PCy_3$)," Organometallics, (1998), 17, pp. 5190–5196.*

Fürstner, A., et al., "Cationic ruthenium allenylidene complexes as a new class of performing catalysts for ring closing metathesis," Chem. Commun., (1998), pp. 1315–1316.*

Ting, P., et al., "Cyclopropenation and Related Reactions of Ruthenium Vinylidene Complexes," J. Am. Chem. Soc., (1996), 118, pp. 6433–6444.*

Grünwald, C., et al., "Five–Coordinate 16–Electron Carbene– and Vinylideneruthenium(II) Complexes Prepared from $[RuCl_2(C_8H_{12})]_n$ or from the new Dihydridoruthenium(IV) Compound $[RuH_2Cl_2(P^iPr_3)_2]$," Organometallics, (1996), 15, pp. 1960–1962.*

Wolf, J., et al., "Ruthenium Trichloride, Tricyclohexylphosphane, 1–Alkynes, Magnesium, Hydrogen, and Water—Ingredients of an Efficient One–Pot Synthesis of Ruthenium Catalysts for Olefin Metathesis," Angew. Chem. Int. Ed., (1998), 37, No. 8, pp. 1124–1126.*

Wolf, J., et al., "Synthesis and Molecular Structure of Six–Coordinate Dichlorodihydridoruthenium(IV) and Five–Coordinate Vinylideneruthenium(II) Complexes," Eur. J. Inorg. Chem., (1998), pp. 1827–1834.*

Espuelas, J., et al., "Synthesis of New Hydride–Carbyne and Hydride–Vinylcarbyne Complexes of Osmium(II) by Reaction of $OsH_2Cl_2(P\text{–}i\text{–}Pr_3)_2$ with Terminal Alkynes," J. Am. Chem. Soc., (1993), 115, pp. 4683–4689.*

Bruce, M.I., et al., "Organometallic Chemistry of Vinylidene and Related Unsaturated Carbenes," Chem., Rev., (1991), 91, pp. 197–257.*

Oliván, M., et al., "Isomeric Hydrido/Vinylidene, MH(halide)$(C{=}CH_2)L_2$, and Ethylidyne, M(halide)$(C\text{–}CH_3)L_2$ (M=Os, Ru; L=Phosphine), Are Energetically Similar but Not Interconverting," Organometallics, (1998), 17, pp. 897–901.*

Oliván, M., et al., "Hydride Is Not a Spectator Ligand in the Formation of Hydrido Vinylidene from Terminal Alkyne and Ruthenium and Osmium Hydrides: Mechanistic Differences," Organometallics, (1998), 17, pp. 3091–3100.*

Cadierno, V., et al., "Selective Synthesis of Indenylruthenium(II) Vinylvinylidene Complexes via Unstable Allenylidene Intermediates: Unexpected Formation of Alkenyl–Phosphonio Complexes (E)–$[Ru\{C(H){=}C(PPh_3)R\}(\eta^5\text{–}C_9H_7)(PPh_3)_2][PF_6]$ (R=1–Cyclohexenyl, 1–Cycloheptenyl) through Nucleophilic Addition of Triphenylphosphine on Vinylvinylidene Derivatives," Organometallics, (1997), 16, pp. 3178–3187.*

Xia, H.P., et al., "$C_5H_5$–Bridged Dimeric Ruthenium Complexes," Organometallics, (1997), vol. 16, No. 1, pp. 1–4.*

(List continued on next page.)

*Primary Examiner*—Fred Teskin
(74) *Attorney, Agent, or Firm*—Dianne E. Reed; Reed & Eberle LLP

(57) ABSTRACT

The present invention generally relates to the use of certain ruthenium and osmium complexes that are substantially inactive at a first temperature (preferably about room temperature) but becomes progressively more active at a higher second temperature. This difference in reactivities allows the reaction mixture to be formed and manipulated at the first temperature until polymerization is desired. When appropriate, the reaction mixture is heated to a suitable temperature (preferably greater than 50° C.) to activate the catalyst and to initiate polymerization. Because both the initiation and the rate of polymerization may be controlled with temperature, the inventive methods are especially suitable for ring opening metathesis polymerization ("ROMP") reactions and for molding polymer articles that require extended pot-lives.

37 Claims, No Drawings

OTHER PUBLICATIONS

Yang, S.M., et al., "Ruthenium Vinylidene and δ–Acetylide Complexes Containing 1,4,7–Trimethyl–1,4,7–triazacyclononane ($Me_3$tacn): Synthesis and Alkyne–Coupling Reactivity," Organometallics, (1997), 16, pp. 2819–2826.*

Knaup, W., et al., "Synthese und Reaktionen von Alkinyl–, Vinyliden–und Vinyl–Osmium(II)–Komplexen mit $[C_6H_6Os(PR_3)]$ als Strukturelement," Journal of Organometallic Chemistry, (1991), 411, pp. 471–489.*

Esteruelas, M.A., et al., "Reactions of Osmium Hydride Complexes with Terminal Alkynes: Synthesis and Catalytic Activity of $OsH(\eta^2–O_2CCH_3)(C{=}CHPh)(PiPr_3)_2$," Organometallics, (1994), 13, pp. 1507–1509.*

Esteruelas, M.A., et al., "Reactions of the Dihydrogen Complex $OsCl_2(\eta^2–H_2)(CO)(PiPr_3)_2$ with Terminal Alkynes: Synthesis of Carbene, Vinylcarbene, and $\mu$–Bis–Carbene Osmium(II) Derivatives," J. Am. Chem. Soc., (1995), 117, pp. 7935–7942.*

Bourgault, M., et al., "Synthesis, Spectroscopic Characterization, and Reactivity of the Unusual Five–Coordinate Hydrido–Vinylidene Complex $OsHCl(C{=}CHPh)(PiPr_3)_2$: Precursor for Dioxygen Activation," Organometallics, (1997), 16, pp. 636–645.*

Buil, M.L., et al., "The $Os(CO)(P^iPr_3)_2$ Unit as a Support for the Transformation of Two Alkyne Molecules into New Organometallic Ligands," Organometallics, (1997), 16, pp. 3169–3177.*

* cited by examiner

THERMALLY INITIATED POLYMERIZATION OF OLEFINS USING RUTHENIUM OR OSMIUM VINYLIDENE COMPLEXES

Matter enclosed in heavy brackets [ ] appears in the original patent but forms no part of this reissue specification; matter printed in italics indicates the additions made by reissue.

This application claims the benefit of U.S. Provisional Application No. 60/094,902, filed Jul. 31, 1998 by inventors Robert H. Grubbs and Thomas E. Wilhelm entitled THERMALLY INITIATED POLYMERIZATION OF CYCLIC OLEFINS USING RUTHENIUM OR OSMIUM VINYLIDENE COMPLEXES. Provisional Patent Application No. 60/094,902 is incorporated herein by reference.

The U.S. Government has certain rights in this invention pursuant to Grant No. CHE 9509745 awarded by the National Science Foundation.

BACKGROUND

The molding of thermoset polymers is a technologically important processing technique. In one version of this technique, a liquid monomer (e.g., an olefin) and a polymerization catalyst are mixed and poured, cast or injected into a mold. The polymerization proceeds (the article "cures") and on completion the molded part is removed from the mold for any post cure processing that may be required. The polymerization reaction mixture may optionally contain additional ingredients such as modifiers, fillers, reinforcements, and pigments.

The time during which the liquid monomer/catalyst mixture can be worked on after the monomer and catalyst are mixed is called the "pot life" of the polymerization reaction mixture. In general, the ability to control reaction rates increases in importance in the molding of larger parts. To mold successfully, the reaction mixture must not cure so quickly that the liquid monomer/catalyst mixture polymerizes before the mixture can be introduced in to the mold or before the catalyst has had time to completely dissolve. However, for convenience and expedient cycle time, it is also important that the catalyst activate within a reasonable time after the mold is filled.

Reaction Injection Molding ("RIM") has previously been used for the molding of polymer articles using a polymerization catalyst and olefin monomer (U.S. Pat. Nos. 4,400,340 and 4,943,621). In these previous processes, a metal (W or Mo) containing compound is dissolved in a first monomer stream. The monomer streams are then mixed and the metal containing compound and the alkyl aluminum compound react to form an active catalyst which then catalyzes the polymerization reaction. Because the reaction proceeds extremely quickly once the catalyst is formed, any attempt to modulate the polymerization time relies on delaying the formation of the active catalyst species. For example, the alkyl aluminum compound stream typically includes an inhibitor, usually a Lewis base, which suppresses the formation of the catalyst.

As molding processes tackle larger and more complicated polymeric components, there is an increasing need for more reliable systems which can extend pot life and/or control the rate of metathesis polymerization reactions.

SUMMARY OF THE INVENTION

The present invention addresses these needs by providing compositions for olefin metathesis reaction but whose reaction rate may be controlled. In general, the catalysts are vinylidene ruthenium and osmium complexes that are substantially inactive at a first temperature (preferably about room temperature) but become progressively more active at higher temperatures. This difference in reactivities allows the reaction mixture to be formed and manipulated at the first temperature until polymerization is desired. When appropriate, the reaction mixture is heated to a suitable second temperature (preferably greater than about 50° C.) to activate the catalyst to initiate polymerization. In preferred embodiments, the heat activation occurs in bursts (as opposed to the continuous application of heat) so as to slow the reaction rate and to allow for a more complete incorporation of the monomers before crosslinking. Other than the requirement for heat activation, the inventive compositions may be used in a similar manner as known olefin metathesis catalysts, particularly ruthenium and osmium complex catalysts. Because the initiation and rate of polymerization may be controlled with temperature, the inventive methods are especially suitable for ring opening metathesis polymerization ("ROMP") reactions and for molding polymer articles that require extended pot-lives.

DESCRIPTION OF THE PREFERRED EMBODIMENTS

The present invention relates to methods for extending the pot life and/or controlling the rate of metathesis polymerization reaction. More particularly, the present invention relates to the use of a metathesis catalysts that are substantially inactive at a first temperature but become progressively more active at higher temperatures.

In general, the initiation and/or rate of metathesis polymerization is controlled by the practice of the inventive methods which comprises:

(i) contacting a metathesis catalyst of the present invention with an olefin in a reaction mixture at a first temperature and (ii) heating the reaction mixture to a second temperature.

Because the metathesis catalysts of the present invention are substantially unreactive at the first temperature (preferably about room temperature), the catalyst may be admixed with the reaction mixture containing one or more olefin monomers and manipulated at this temperature until polymerization initiation is desired. At the appropriate time, the mixture containing the catalyst is activated by heating the mixture to a second temperature. In preferred embodiments, the second temperature is at least about 50° C., more preferably at least about 75° C.

In one embodiment, the metathesis catalysts are of the general formula:

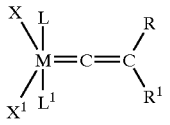

wherein:

M is ruthenium or osmium;

X and $X^1$ are each independently any anionic ligand;

L and $L^1$ are each independently any neutral electron donor ligand; and,

R and $R^1$ are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl. Optionally, each of the R or $R^1$ substituent group may be substituted with one or more moieties selected from the group consisting of $C_1$–$C_{10}$ alkyl, $C_1$–$C_{10}$ alkoxy, and aryl which in turn may each be further substituted with one or more groups selected from a halogen, a $C_1$–$C_5$ alkyl, $C_1$–$C_5$ alkoxy, and phenyl. Moreover, any of the catalyst ligands may further include one or more functional groups. Examples of suitable functional groups include but are not limited to: alcohol, sulfonic acid, phosphine, thiol, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, and halogen.

In preferred embodiments of these catalysts, the R substituent is hydrogen and the $R^1$ substituent is selected from the group consisting of $C_1$–$C_{10}$ alkyl, $C_2$–$C_{10}$ alkenyl, and aryl. In even more preferred embodiments, the $R^1$ substituent is phenyl, methyl, isopropyl, or tertbutyl, each optionally substituted with one or more moieties selected from the group consisting of $C_1$–$C_5$ alkyl, $C_1$–$C_5$ alkoxy, phenyl, and a functional group. In especially preferred embodiments, $R^1$ is phenyl optionally substituted with one or more moieties selected from the group consisting of chloride, bromide, iodide, fluoride, —$NO_2$, —$NMe_2$, methyl, methoxy and phenyl.

In preferred embodiments of these catalysts, X and $X^1$ are each independently hydrogen, halide, or one of the following groups: $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, arylsulfonate, $C_1$–$C_{20}$ alkylsulfonate, $C_1$–$C_{20}$ alkylthio, $C_1$–$C_{20}$ alkylsulfonyl, or $C_1$–$C_{20}$ alkylsulfinyl. Optionally, X and $X^1$ may be substituted with one or more moieties selected from the group consisting of $C_1$–$C_{10}$ alkyl, $C_1$–$C_{10}$ alkoxy, and aryl which in turn may each be further substituted with one or more groups selected from halogen, $C_1$–$C_5$ alkyl, $C_1$–$C_5$ alkoxy, and phenyl. In more preferred embodiments, X and $X^1$ are halide, benzoate, $C_1$–$C_5$ carboxylate, $C_1$–$C_5$ alkyl, phenoxy, $C_1$–$C_5$ alkoxy, $C_1$–$C_5$ alkylthio, aryl, and $C_1$–$C_5$ alkyl sulfonate. In even more preferred embodiments, X and $X^1$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethanesulfonate. In the most preferred embodiments, X and $X^1$ are each chloride.

In preferred embodiments of these catalysts, L and $L^1$ are each independently selected from the group consisting of phosphine, sulfonated phosphine, phosphite, phosphinite, phosphonite, arsine, stibine, ether, amine, amide, imine, sulfoxide, carboxyl, nitrosyl, pyridine, thioether and heterocyclic carbene. In more preferred embodiments, L and $L^1$ are each either (i) a phosphine of the formula $PR^3R^4R^5$, where $R^3$, $R^4$, and $R^5$ are each independently aryl or $C_1$–$C_{10}$ alkyl, particularly primary alkyl, secondary alkyl or cycloalkyl or (ii) a heterocyclic carbene of the formula:

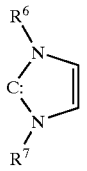

wherein $R^6$ and $R^7$ are each independently selected from the group consisting of $C_1$–$C_{20}$ alkyl, $C_2$–$C_{20}$ alkenyl, $C_2$–$C_{20}$ alkynyl, cycloalkyl, and aryl. $R^6$ and $R^7$ may each be optionally substituted with one or more substituents selected from the group consisting of $C_1$–$C_{10}$ alkyl, $C_1$–$C_{10}$ alkoxy, and aryl which in turn may each be further substituted with one or more groups selected from halogen, $C_1$–$C_5$ alkyl, $C_1$–$C_5$ alkoxy, and phenyl. Without being bound by theory, it is believed that bulkier $R^6$ and $R^7$ groups result in catalysts with improved characteristics such as thermal stability. In even more preferred embodiments where L and/or $L^1$ is a heterocyclic carbene, $R^6$ and $R^7$ are the same and each is of the formula:

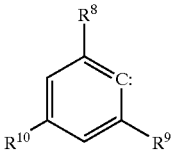

wherein:

$R^8$ and $R^9$ are each independently hydrogen, $C_1$–$C_3$ alkyl or $C_1$–$C_3$ alkoxy; and, $R^{10}$ is hydrogen, $C_1$–$C_{10}$ alkyl, aryl, or a functional group selected from hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

In the most preferred embodiments, L and $L^1$ are each selected from the group consisting of —P(cyclohexyl)$_3$, —P(cyclopentyl)$_3$, —P(isopropyl)$_3$, —P(phenyl)$_3$, and 1,3-dimesityl imidazole (designated as "IMes").

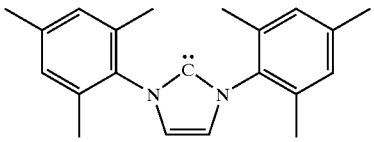

IMes

In another embodiment, the metathesis catalysts are of the general formula:

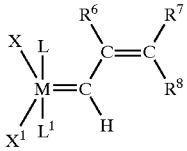

wherein X, $X^1$, L, and $L^1$ are as previously described and $R^6$, $R^7$, and $R^8$ are the same as $R^1$.

Examples of the most preferred catalysts for the practice of the present invention include:

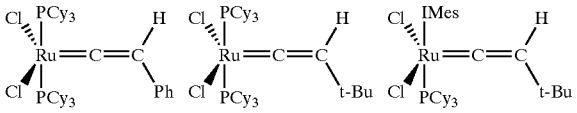

wherein $PCy_3$ is selected from the group consisting of —P(cyclohexyl)$_3$, —P(cyclopentyl)$_3$, —P(isopropyl)$_3$, and —P(phenyl)$_3$.

In preferred embodiments of the inventive method, heat activation occurs in bursts rather than through continuous application of heat. For example, in the most preferred embodiment, the reaction is placed in a oil bath set at 75° C. for 1 minute every 10 minutes until polymerization is completed. It has been unexpectedly found that heating in a staccato manner versus continuous heating during activation and polymerization results in a superior polymer due to a more complete incorporation of the monomer before the resulting polymer crosslinks to itself.

Other than the requirement for heat activation, the catalysts of the present invention may be used in a similar manner as other olefin metathesis catalysts. However, the use of these catalysts for ring-opening metathesis polymerization ("ROMP") of functionalized or unfunctionalized cyclic olefins is particularly preferred.

The cyclic olefins may be strained or unstrained, monocyclic or polycyclic, may optionally include heteroatoms, and may include one or more functional groups. Suitable cyclic olefins include but are not limited to norbornene, norbornadiene, dicyclopentadiene, cyclopentene, cycloheptene, cyclooctene, cyclooctadiene, cyclododecene, 7-oxanorbornene, 7-oxanorbornadiene, and derivatives therefrom. Illustrative examples of suitable functional groups include but are not limited to hydroxyl, thiol, ketone, aldehyde, ester, ether, amine, imine, amide, nitro, carboxylic acid, disulfide, carbonate, isocyanate, carbodiimide, carboalkoxy, and halogen. Preferred cyclic olefins include norbornene and dicyclopentadiene and their respective homologs and derivatives. The use of dicyclopentadiene ("DCPD") for ROMP polymerization is particularly preferred.

The ROMP reaction may occur either in the presence or absence of solvent and may optionally include formulation auxiliaries. Known auxiliaries include antistatics, antioxidants (primary antioxidants, secondary antioxidants, or mixtures thereof), ceramics, light stabilizers, plasticizers, dyes, pigments, fillers, reinforcing fibers, lubricants, adhesion promoters, viscosity-increasing agents and demolding enhancers. Illustrative examples of fillers for improving the optical physical, mechanical and electrical properties include glass and quartz in the form of powders, beads and fibers, metal and semi-metal oxides, carbonates (i.e. $MgCO_3$, $CaCO_3$), dolomite, metal sulfates (such as gypsum and barite), natural and synthetic silicates (i.e. zeolites, wollastonite, feldspars), carbon fibers, and plastic fibers or powders.

Practice of the present invention is particularly suitable for molding polymer articles because the pot-life of the reaction is essentially controllable at will. The reaction mixture may either be prepared in the mold or prepared outside of the mold and then introduced into the mold. When polymerization is desired, the reaction mixture in the mold is heated to a suitable temperature to initiate polymerization. In contrast to prior art systems that require one or more additives to retard the formation of the active catalyst and/or inhibit monomer polymerization, the present method relies on the inactivity of the catalyst at one temperature and activity of the catalyst at a second higher temperature.

EXAMPLE 1

Synthesis of (PCy3)2Cl2Ru═Cu═CHPh

In a drybox, 2.5 g of [(p-cymene)$RuCl_2$]$_2$ (8.2 mmol Ru) and 4.6 g (16.4 mmol) of tricyclohexylphosphine was added into a Fisher-Porter bottle. After connecting the bottle to a Schlenk line, 0.90 mL of phenylacetylene (8.2 mmol) and 150 mL of dry degassed benzene was added. The reaction mixture was heated to 90° C. for 24 hours, then allowed to cool to room temperature. Upon cooling, a light white-purple solid can be isolated and washed with pentane, and left to dry in-vacuo, 6.6 g of $(PCy_3)_3Cl_2Ru{=}C{=}CHPh$ (hereinafter referred to as a catalyst 1) was isolated in 97% yield. $^1H$ NMR: ($CD_2Cl_2$) 6.82–7.12 (5H, Ru═C═CHPh), 4.35 (t, 1H, J=3.7 Hz, Ru═C═CHPh), 1.17–2.24 (~66H, $PCy_3$). $^{31}P$ NMR: ($CD_2Cl_2$): 22.42 (s, $PCy_3$). An osmium counterpart may be synthesized analogously. Other ruthenium/osmium vinylidene derivatives may be prepared using acetylenes containing the desired substituents.

EXAMPLE 2

Alternate Method for Synthesis of 1

2.5 g of [(p-cymene)$RuCl_2$](8.2 mmol Ru) and 4.6 g of tricyclohexylphosphine (16.33 mmol) are placed in a Fisher Porter bottle or in a suitably sized thick wall Schlenk flask (with lots of headspace). Benzene (60 mL) and phenylacetylene (0.90 mL, 8.2 mmol) are then added. The headspace is subsequently evacuated, and the reaction is heated at 90° C. for 18 hours. After the reaction mixture is allows to cool, a purple-white solid precipitates, which is filtered and washed with pentane (3×5 mL). Isolated 6.6 g (97% yield). Alternatively, this reaction can also be performed with [(benzene)$RuCl_2$]$_2$ (0.500 g, 2.0 mmol Ru), tricyclohexylphosphine (1.12 g, 4.0 mmol), and phenylacetylene (0.22 mL, 2.0 mmol) as reactants to give 1.59 g (95% yield of 1).

Selected NMR data: ($CD_2Cl_2$): $^1H$: δ 7.10 (dd, Ph—$H_m$, J=8.04, 7.32 Hz, 2H), 6.88 (d, Ph—$H_o$, J=8.04 Hz, 2H), 6.82 (t, Ph—$H_p$, J=7.32 Hz, 1H), 4.35 (t, Ru═C═CHPh, J=3.7 Hz) 2.61–1.99 ($PCy_3$, 66H); $^{31}P$: δ 22.41 (s, $RuPCy_3$).

EXAMPLE 3

$(PCy_3)_2Cl_2Ru({=}C{=}CHtBu)$(catalyst 2)

In a procedure identical to that immediately above for catalyst 1, benzene (30 mL) and t-butylacetylene (0.269 mL, 3.28 mmol) are added to a mixture of [(p-cymene)$RuCl_2$]$_2$ (1 g, 3.28 mmol Ru) and tricyclohexylphosphine (1.84 g, 6.56 mmol). 2.4 g of 2 is isolated for a 90% yield.

Selected NMR data: ($C_6D_6$): $^1H$: δ 4.59 (t, Ru═C—CHtBu, J=3.7 Hz); $^{31}P$: δ 18.6 (s, $RuPCy_3$).

EXAMPLE 4

$(PCy_3)_2Cl_2Ru({=}C{=}CHC_4H_9)$ (catalyst 3)

[(p-cymene)$RuCl_2$]$_2$ (0.500 g, 1.63 mmol Ru), tricyclohexylphosphine (0.915 g, 3.27 mmol) are placed in a Fisher Porter bottle or in a suitably sized thick walled Schlenk flask (with lots of headspace). Benzene (30 mL) and 1-hexyne (0.0375 mL, 1.63 mmol) are added, and the headspace is evacuated. The reaction is stirred at 90° C. for 18 hours, and after cooling only a small amount of solid has precipitated. The solvent is removed, and methanol is added to give an orange-pink solid, which is filtered and washed with methanol until the washings are colorless. 1.2 g of 3 is isolated for a 94% yield.

Selected NMR data: ($C_6D_6$): $^1H$: δ 3.42 (t, Ru═C═CH, J=7.3 Hz), 2.58 (m, $RuPCH(CH_2)_5$, 6H), 2.35 (q, Ru═C═CH($CH_2$)—, J=6.6 Hz, 2H), 2.04, 1.78, 1.59, 1.24 (all $RuPCH(CH_2)_5$, 60H total), 1.63 (br s, Ru═C═CH($CH_2$)($CH_2$)2($CH_3$), J=7.32 Hz, 3H); $^{31}P$: δ 25.84 (s, $RuPCy_3$).

EXAMPLE 5

Miscellaneous Notes on the Synthesized Catalysts

All of the above catalysts (when mixed with one or more suitable cyclic olefins) displayed little or no significant polymerization reaction after 2.5 weeks at room temperature. Each of these catalysts displayed higher activity at temperatures well above room temperature. The relative solubility of the catalyst in DCPD were as follows: 1<2<3 (with catalyst 3 being most soluble in DCPD). In general, catalysts that display increased solubility in the desired cyclic olefin are preferred. For example, for DCPD polymerization, catalysts that have more hydrophobic substituents (i.e. longer aliphatic substituents) off the vinyl group tend to be more soluble in DCPD and thus are generally preferred over less hydrophobic catalysts.

EXAMPLE 6

Solventless DCPD Polymerization 10 mg of catalyst 1 was added to 12 mL of stirring DCPD (approximately 7500 equivalents of monomer). Not all of the 10 mg of catalyst 1 is immediately soluble. When this mixture is left at room temperature, the polymerization reaction rate is negligible even after 24 hours. However, when the mixture is heated to between about 70 and about 80° C., catalyst 1 completely dissolves and the reaction proceeds to completion.

EXAMPLE 7

DCPD Polymerization in the Presence of Solvent

A 10 mg portion of I is dissolved in a minimum of the solvent $CH_2Cl_2$ and then was added to 12 mL of stirring DCPD. As above, polymerization is virtually undetectable after 24 hours. However, when the mixture is heated to between about 70 and about 80° C., the catalyst is activated and the reaction proceeds to completion.

EXAMPLE 8

DCPD Polymerization with $(PCy_3)(IMes)Cl_2Ru$ (=C=CHtbu) (catalyst 4)

A mixture of 20 mg (0.024 mmoles) of catalyst 4 was mixed with 15 mL of DCPD. After 5 minutes at room temperature, no apparent reaction had taken place. The side of the reaction vessel was heated with a heat gun. Immediately thereafter, a polymerization front was observed, propagating from the heated site until the entire sample was converted into a solid part.

EXAMPLE 9

Heat Activation of the Ruthenium/Osmium Vinylidene Complexes

Any suitable method quickly and evenly applying heat to the reaction vessel may be used. For example, the reaction vessel may be placed in an oil bath set to approximately 75° C. and left to stir. In left in the oil bath for about 10–20 minutes, reaction becomes sufficiently viscous so that the reaction stops stirring. A solid material is typically obtained after 30 minutes. The resulting material is soft and flexible and indicates that not all of the DCPD monomer was consumed before the polymers are crosslinked.

Unexpectedly, better results are obtained when the heat application is in quick bursts and not continuous. For example, when the reaction mixture is placed in a heated oil bath for about 1 minute every 10 minutes, a substantially superior product results. In general, the heat burst is applied until the color (i.e. turns an amberish hue in case of DCPD polymerization) and viscosity (i.e. starts to increase) of the mixture indicates that the polymerization has initiated to a suitable level. In this manner, because virtually all of the DCPD monomers are reacted before the polymers are crosslinked, the resulting polymer displays very desirable strength characteristics. This polymer product appears to be identical in its physical properties as that produced using a more active carbene catalyst such as $(PCy_3)_2Cl_2Ru$=CHPh.

Heating with a heat gun for about 1 minute every 10 minutes also produced similar results. The quick bursts of heat appear to lead to a more complete activation of catalyst 1 and a more complete incorporation of the monomer than continuous applications of heat. The time between the burst of heat appears to allow the mixture to cool and sufficiently slows the polymerization reaction to allow for better mixing of the reactants.

What is claimed is:

1. A method for controlling the initiation of metathesis polymerization comprising:

contacting a metathesis catalyst with an olefin in a reaction mixture at a first temperature and heating the reaction mixture to a second temperature wherein the metathesis catalyst is of the formula:

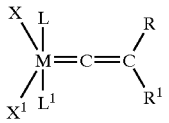

wherein:

M is ruthenium or osmium;

X and $X^1$ are each independently any anionic ligand;

L and $L^1$ are each independently any neutral electron donor ligand; and,

R and $R^1$ are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, the substituent optionally substituted with one or moieties selected from the group consisting of $C_1$–$C_{10}$ alkyl, $C_1$–$C_{10}$ alkoxy, and aryl.

2. The method as in claim 1 wherein the first temperature is about room temperature.

3. The method as in claim 2 wherein the second temperature is at least about 50° C.

4. The method as in claim 3 wherein the catalyst includes one or more functional groups selected from the group consisting of alcohol, sulfonic acid, phosphine, thiol, thioether, ketone, aldehyde, ester, ether, amine, imine, amide, imide, imido, nitro, carboxylic acid, disulfide, carbonate, isocyanate, carbodiimide, carboalkoxy, carbamate, acetal, ketal, boronate, cyano, cyanohydrin, hydrazine, oxime, hydrazide, enamine, sulfone, sulfide, sulfenyl, and halogen.

5. The method as in claim 3 wherein:

M is ruthenium;

R is hydrogen;

$R^1$ is selected from the group consisting of $C_1$–$C_{10}$ alkyl, $C_2$–$C_{10}$ alkenyl, and aryl;

X and $X^1$ are each independently selected from the group consisting of hydrogen, halide, $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, arylsulfonate, $C_1$–$C_{20}$ alkylsul fonate, $C_1$–$C_{20}$ alkylthio, $C_1$–$C_{20}$ alkylsulfonyl, and $C_1$–$C_{20}$ alkylsulfinyl; and L and $L^1$ are each independently selected from the group consisting of phosphine, sulfonated phosphine, phosphite, phosphinite, phosphonite, arsine, stibine, ether, amine, amide, imine, sulfoxide, carboxyl, nitrosyl, pyridine, thioether and heterocyclic carbene.

6. The method as in claim 5 wherein:

$R^1$ is selected from the group consisting of phenyl, methyl, isopropyl, and tertbutyl;

X and $X^1$ are each independently selected from the group consisting of halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate; and L and $L^1$ are each independently either (i) a phosphine of the formula $PR^3R^4R^5$, wherein $R^3$, $R^4$, and $R^5$ are each independently aryl or $C_1$–$C_{10}$ alkyl, particularly primary alkyl, secondary alkyl or cycloalkyl or (ii) a heterocyclic carbene of the formula:

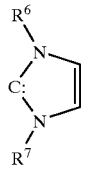

wherein $R^6$ and $R^7$ are each independently selected from the group consisting of $C_1$–$C_{20}$alkyl, $C_2$–$C_{20}$ alkenyl, $C_2$–$C_{20}$ alkynyl, cycloalkyl, and aryl, each optionally substituted with one or more moieties selected from the group consisting of $C_1$–$C_{10}$ alkyl, $C_1$–$C_{10}$ alkoxy, and aryl.

7. The method as in claim 6 wherein:

X and $X^1$ are each a halide and

L and $L^1$ are selected from a group consisting of —P(cyclohexyl)$_3$, —P(cyclopentyl)$_3$, —P(isopropyl)3, —P(phenyl)$_3$, and IMes wherein IMes is 1,3-dimesityl imidazole.

8. The method as in claim 7 wherein the catalyst is selected from the group consisting of:

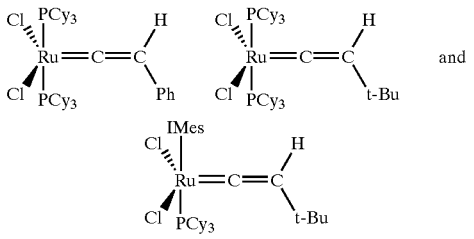

wherein $PCy_3$ is selected from the group consisting of —P(cyclohexyl)$_3$, —P(cyclopentyl)$_3$, —P(isopropyl)$_3$, and —P(phenyl)$_3$.

9. A method for controlling the initiation of ROMP polymerization comprising:

contacting a metathesis catalyst with a cyclic olefin in a reaction mixture at a first temperature and heating the reaction mixture to a second temperature wherein the metathesis catalyst is of the formula:

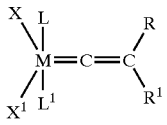

wherein:

M is ruthenium;

R is hydrogen;

$R^1$ is selected from the group consisting of $C_1$–$C_{10}$ alkyl, $C_2$–$C_{10}$ alkenyl, and aryl;

X and $X^1$ are each independently selected from the group consisting of halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate; and L and $L^1$ are each independently either (i) a phosphine of the formula $PR^3R^4R^5$, wherein $R^3$, $R^4$, and $R^5$ are each independently aryl or $C_1$–$C_{10}$ alkyl, particularly primary alkyl, secondary alkyl or cycloalkyl or (ii) a heterocyclic carbene of the formula:

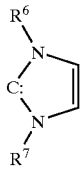

wherein $R^6$ and $R^7$ are each independently selected from the group consisting of $C_1$–$C_{20}$ alkyl, $C_2$–$C_{20}$ alkenyl, $C_2$–$C_{20}$ alkynyl, cycloalkyl, and aryl, each optionally substituted with one or more moieties selected from the group consisting of $C_1$–$C_{10}$ alkyl, $C_1$–$C_{10}$ alkoxy, and aryl.

10. The method as in claim 9 wherein:

$R^1$ is selected from the group consisting of phenyl, methyl, isopropyl, and tertbutyl;

X and $X^1$ are each chloride; and

L and $L^1$ are each independently selected from a group consisting of —P(cyclohexyl)$_3$, —P(cyclopentyl)$_3$, —P(isopropyl)$_3$, —P(phenyl)$_3$, and IMes wherein IMes is 1,3-dimesityl imidazole.

11. The method as in claim 9 wherein the cyclic olefin is selected from the group consisting of norbornene, norbornadiene, dicyclopentadiene, cyclopentene, cycloheptene, cyclooctene, cyclooctadiene, cyclododecene, 7-oxanorbornene, 7-oxanorbornadiene, and derivatives therefrom.

12. The method as in claim 9 wherein the first temperature is about room temperature.

13. The method as in claim 9 wherein the second temperature is at least about 50° C.

14. The method as in claim 9 wherein the second temperature is at least about 75° C.

15. The method as in claim 11 wherein the reaction mixture includes one or more formulation auxiliaries.

16. The method as in claim 12 wherein the heating occurs in bursts rather than being continuous.

17. A method of making molded parts comprising:

adding a metathesis catalyst and dicyclopentadiene to a mold at a first temperature and heating the mold to a second temperature wherein the metathesis catalyst is of the formula:

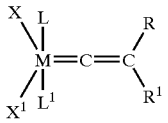

wherein:

M is ruthenium;

R is hydrogen;

$R^1$ is selected from the group consisting of $C_1$–$C_{10}$ alkyl, $C_2$–$C_{10}$ alkenyl, and aryl;

X and $X^1$ are halide; and

L and $L^1$ are each independently selected from a group consisting of —P(cyclohexyl)$_3$, —P(cyclopentyl)$_3$, —P(isopropyl)$_3$, —P(phenyl)$_3$, and IMes wherein IMes is 1,3-dimesityl imidazole.

18. The method as in claim 17 wherein the catalyst is selected from the group consisting of:

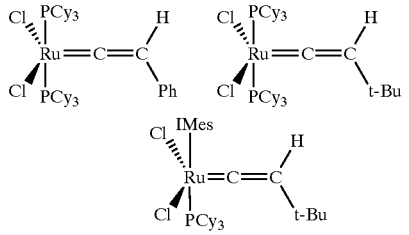

wherein $PCy_3$ is selected from the group consisting of —P(cyclohexyl)$_3$, —P(cyclopentyl)$_3$, —P(isopropyl)$_3$, and —P(phenyl)$_3$.

19. The method as in claim 17 wherein the first temperature is about room temperature and the second temperature is at least about 50° C.

20. The method as in claim 17 wherein the first temperature is about room temperature and the second temperature is between about 70° C. and about 80° C.

21. The method as in claim 17 wherein the reaction mixture includes one or more formulation auxiliaries selected from the group consisting of antistatics, antioxidants, light stabilizers, plasticizers, dyes, pigments, fillers, reinforcing fibers, lubricants, adhesion promoters, viscosity-increasing agents and demolding enhancers.

22. The method as in claim 17 wherein the heating occurs in bursts rather than being continuous.

*23. A compound of the formula*

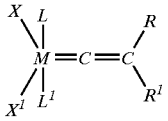

*wherein:*

*M is ruthenium or osmium;*

*X and $X^1$ are each independently any anionic ligand;*

*R and $R^1$ are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, the substituent optionally substituted with one or more moieties selected from the group consisting of $C_1$–$C_{10}$ alkyl, $C_1$–$C_{10}$ alkoxy, and aryl;*

*L is any neutral electron donor ligand; and*

*$L^1$ a heterocyclic carbene of the formula:*

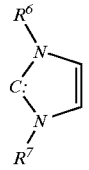

*wherein $R^6$ and $R^7$ are each independently selected from the group consisting of $C_1$–$C_{20}$ alkyl, $C_2$–$C_{20}$ alkenyl, $C_2$–$C_{20}$ alkynyl, cycloalkyl, and aryl, each optionally substituted with one or more moieties selected from the group consisting of $C_1$–$C_{10}$ alkyl, $C_1$–$C_{10}$ alkoxy, and aryl.*

*24. The compound of claim 23, wherein $R^6$ and $R^7$ are the same and of the formula:*

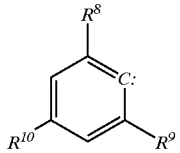

*wherein:*

*$R^8$ and $R^9$ are each independently selected from the group consisting of hydrogen, $C_1$–$C_3$ alkyl and $C_1$–$C_3$ alkoxy; and*

*$R^{10}$ is selected from the group consisting of hydrogen, $C_1$–$C_{10}$ alkyl, aryl, hydroxyl, thiol, thiioether, ketone, aldehyde, ester, ether, amine, imine, amide, nitro, carboxylic acid, disulfide, carbonate, isocyanate, carbodiimide, carboalkoxy, carbamate, and halogen.*

*25. The compound of claim 23, wherein X and $X^1$ are each independently selected from the group consisting of hydrogen, halide, $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, arylsulfonate, $C_1$–$C_{20}$ alkylsulfonate, $C_1$–$C_{20}$ alkylthio, $C_1$–$C_{20}$ alkylsulfonyl, and $C_1$–$C_{20}$ alkylsulfinyl.*

*26. The compound of claim 23, wherein X and $X^1$ are each independently selected from the group consisting of halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate.*

*27. The compound of claim 23, wherein X and $X^1$ are each a halide.*

*28. The compound of claim 23, wherein X and $X^1$ are each chloride.*

*29. The compound of claim 23, wherein L is selected from the group consisting of phosphine, sulfonated phosphine, phosphite, phosphinite, phosphonite, arsine, stibine, ether, amine, amide, imine, sulfoxide, carboxyl, nitrosyl, pyridine, thioether and heterocyclic carbene.*

*30. The compound of claim 23, wherein L and $L^1$ are each independently a heterocyclic carbene of the formula:*

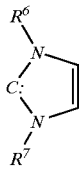

wherein $R^6$ and $R^7$ are each independently selected from the group consisting of $C_1$–$C_{20}$ alkyl, $C_2$–$C_{20}$ alkenyl, $C_2$–$C_{20}$ alkynyl, cycloalkyl, and aryl, each optionally substituted with one or more moieties selected from the group consisting of $C_1$–$C_{10}$ alkyl, $C_1$–$C_{10}$ alkoxy, and aryl.

31. The compound of claim 30, wherein $R^6$ and $R^7$ are the same and of the formula:

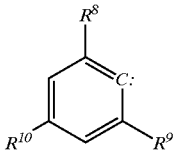

wherein:

$R^8$ and $R^9$ are each independently selected from the group consisting of hydrogen, $C_1$–$C_3$ alkyl and $C_1$–$C_3$ alkoxy; and $R^{10}$ is selected from the group consisting of hydrogen, $C_1$–$C_{10}$ alkyl, aryl, hydroxyl, thiol, thiioether, ketone, aldehyde, ester, ether, amine, imine, amide, nitro, carboxylic acid, disulfide, carbonate, isocyanate, carbodiimide, carboalkoxy, carbamate, and halogen.

32. The compound of claim 23 wherein L is selected from the group consisting of —P(cyclohexyl)$_3$, —P(cyclopentyl)$_3$, —P(isopropyl)$_3$, —P(phenyl)$_3$, and IMes, wherein IMes is 1,3 dimesityl imidazole.

33. The compound of claim 23 where L and $L^1$ are both IMes, wherein IMes is 1,3 dimesityl imidazole.

34. The compound of claim 23, wherein R is hydrogen and $R^1$ is selected from the group consisting of $C_1$–$C_{10}$ alkyl, $C_2$–$C_{10}$ alkenyl, and aryl.

35. The compound of claim 23, wherein R is hydrogen and $R^1$ is selected from the group consisting of phenyl, methyl, isopropyl, and tertbutyl.

36. A compound of the formula

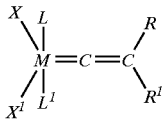

wherein:

M is ruthenium;

X and $X^1$ are each independently selected from the group consisting of halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate;

R and $R^1$ are each independently hydrogen or a substituent selected from the group consisting of phenyl, methyl, isopropyl, and tertbutyl; and L and $L^1$ are each independently a heterocyclic carbene of the formula:

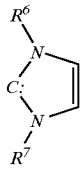

wherein $R^6$ and $R^7$ are each independently selected from the group consisting of $C_1$–$C_{20}$ alkyl, $C_2$–$C_{20}$ alkenyl, $C_2$–$C_{20}$ alkynyl, cycloalkyl, and aryl, each optionally substituted with one or more moieties selected from the group consisting of $C_1$–$C_{10}$ alkyl, $C_1$–$C_{10}$ alkoxy, and aryl.

37. A compound of the formula

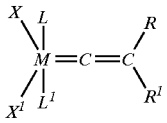

wherein:

M is ruthenium;

X and $X^1$ are both chloride;

R is hydrogen;

$R^1$ is tertbutyl;

L is selected from the group consisting of —P(cyclohexyl)$_3$, —P(cyclopentyl)$_3$, —P(isopropyl)$_3$, and —P(phenyl)$_3$; and $L^1$ is IMes, wherein IMes is 1,3 dimesityl imidazole.

* * * * *